United States Patent [19]

Mazelsky

[11] Patent Number: 4,487,383

[45] Date of Patent: Dec. 11, 1984

[54] CRASHWORTHY REAR-FACING PASSENGER SEAT FOR FIXED WING AIRCRAFT

[75] Inventor: Bernard Mazelsky, West Covina, Calif.

[73] Assignee: ARA, Inc., City of Industry, Calif.

[21] Appl. No.: 426,747

[22] Filed: Sep. 29, 1982

[51] Int. Cl.³ .................. B64D 25/04; B64D 11/06
[52] U.S. Cl. .......................... 244/122 R; 297/216
[58] Field of Search ........ 244/122 R, 122 AG, 122 B; 188/372, 375; 297/216; 74/492

[56] References Cited

U.S. PATENT DOCUMENTS

| | | | |
|---|---|---|---|
| 2,682,931 | 7/1954 | Young | 297/216 |
| 3,145,051 | 8/1964 | Rausch | 297/216 |
| 3,369,634 | 2/1968 | Mazelsky | 188/372 |
| 3,603,638 | 9/1971 | McGregor | 297/216 |
| 4,066,149 | 1/1978 | Mazelsky | 188/372 |
| 4,150,805 | 4/1979 | Mazelsky | 297/216 |
| 4,349,167 | 9/1962 | Reilly | 244/122 R |

FOREIGN PATENT DOCUMENTS 2850479  6/1979  Fed. Rep. of Germany ...... 297/216

OTHER PUBLICATIONS

Reilly, "Crashworthy Troop Seat Investigation" USAAMRDL-TR-74-93, 1974, pp. Cover 53–88, 145–148.

Primary Examiner—Galen L. Barefoot
Attorney, Agent, or Firm—Herzig, Schaap & Yanny

[57] ABSTRACT

A rear-facing crashworthy set for fixed wing aircraft comprises a seat facing in the opposite direction to the direction of flight of the aircraft and energy absorbers attached between the seat and the floor of the aircraft. The energy absorbers include forward energy absorbers attached to a forward section of the seat, intermediate energy absorbers attached rearwardly of the forward energy absorbers, and rearward energy absorbers attached rearwardly of the intermediate energy absorbers, all energy absorbers having the capability of operating in both tension and compression. Stabilizing members are attached between the seat and the floor of the aircraft. Energy attendant upon a crash is absorbed, and the seat is enabled to flex with crash-induced distortions of the floor to prevent separation of the seat therefrom, thus preventing severe injury or death as a result of a second impact of the detached seat with a structural member of the aircraft, such as a bulkhead, under crash conditions.

15 Claims, 2 Drawing Figures

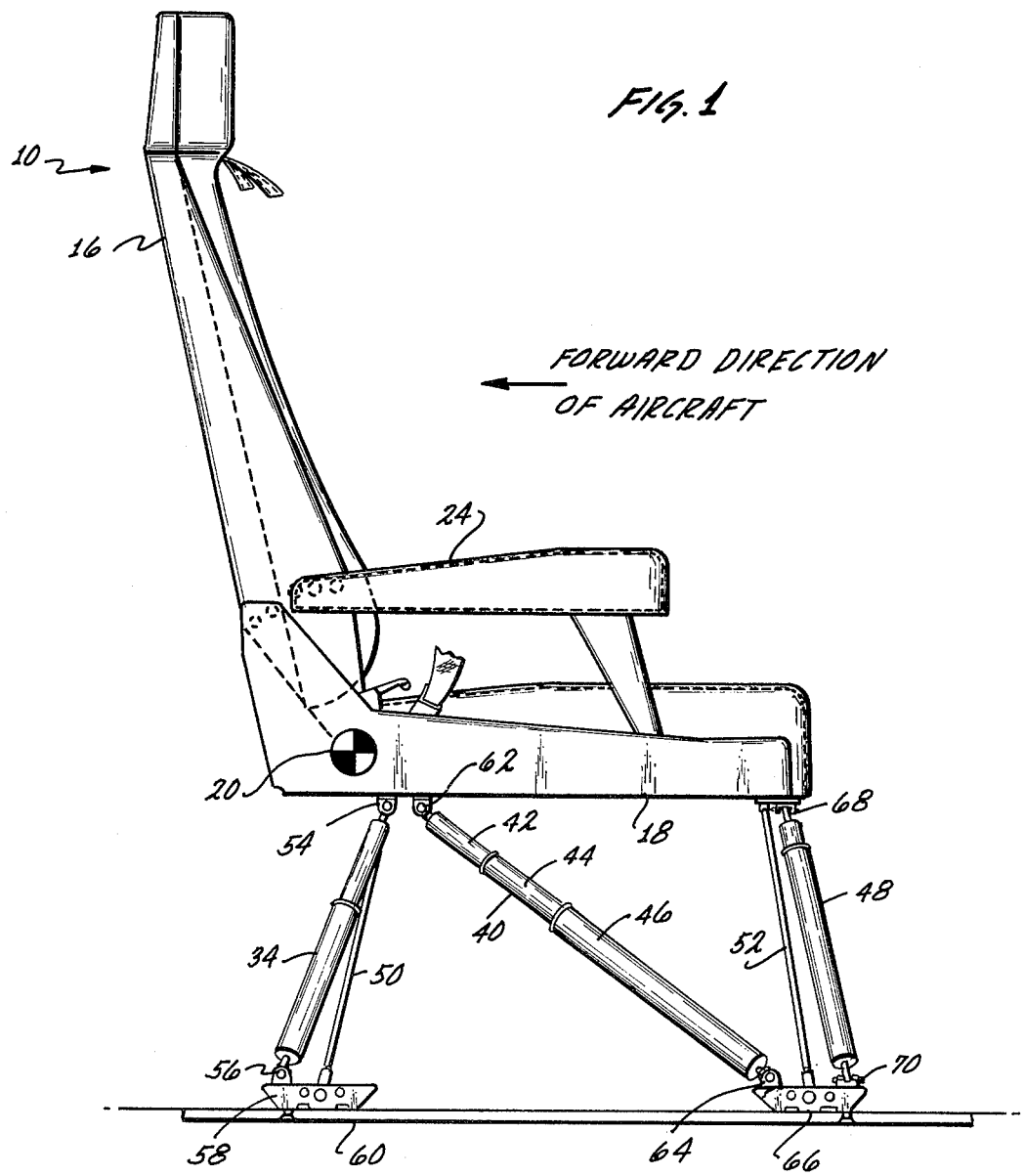

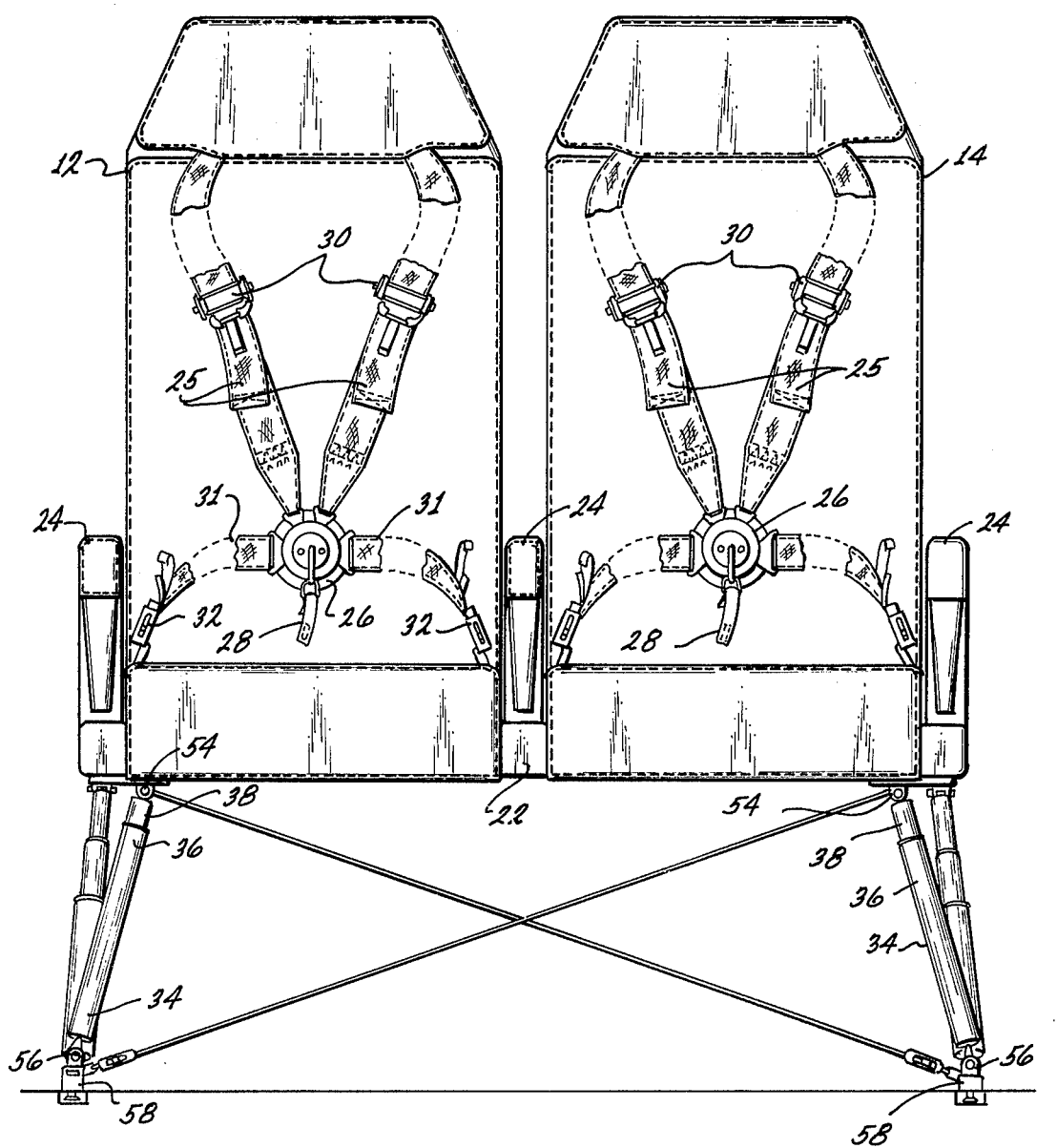

CRASHWORTHY REAR-FACING PASSENGER SEAT FOR FIXED WING AIRCRAFT

BACKGROUND OF THE INVENTION

1. Field of the Invention

The invention relates to crashworthy passenger seats for fixed wing aircraft, and in particular to rearwardly facing two-man passenger seats.

2. Description of the Prior Art

Recently it has become recognized that numerous unnecessary fatalities have occurred in crashes of fixed-wing aircraft, both commercial and military. Investigation and research disclose that these fatilities are primarily caused by the "second impact" which occurs in such crashes. The "second impact" is that impact following the impact of the aircraft with the ground or some other object, which consists of the collision of the passenger with a fixed member of the aircraft, such as a bulkhead. Such "second impacts" are primarily, caused by the separation of the passenger seat from its connection with the floor of the aircraft and its subsequent travel at high speeds, terminating in a collision of the passenger seat and passenger with the fixed member of the aircraft.

Through a number of systems exist for rendering crashworthy the passenger seats of military and commercial rotary wing aircraft, such as the system described and claimed in U.S. Pat. No. 4,150,805 to applicant, these systems do not have ready application in the context of the fixed wing aircraft. The crashes have different profiles with respect to time and force, as well as components of the crash. In connection with crashes of rotary wing aircraft, the crash pulses tend to be more vertical in direction with sharper onset accelerations and shorter total crash times as opposed to fixed wing aircraft which have longer crash times, smaller vertical component of crash, and smaller onset acceleration.

Existing systems for rendering crashworthy passenger seats of fixed wing aircraft suffer from the significant infirmity that the seats are inadequately connected to the floor of the aircraft, thus resulting in detaching thereof under most crash conditions with the consequence of the "second impact" noted above. A primary problem affecting existing passenger seats for fixed wing aircraft is that of distortion of the floor of the aircraft under crash conditions. Due to the requirement for lightweight materials in the structural members of aircraft, such structural members are of necessity not massive and extremely rigid. Under crash conditions, such structures, including the floor of the aircraft, flex significantly. A consequence of such flexing is detachment of existing passenger seats from the vibrating floor. Existing seat attachments in fixed wing aircraft do not have sufficient rigidity or energy absorption capabilities to perform adequately under such conditions of crash-induced floor distortion.

Thus, there has been felt but unfulfilled need for a system for providing crashworthy passenger seats in military and commercial fixed wing aircraft, which will be adaptable to a number of different contexts in the military and commercial areas and will furnish at the same time a maximum of safety for the passengers utilizing such crashworthy seats.

SUMMARY OF INVENTION

A rearward facing craftsworthy seat for fixed wing aircraft comprises seat means oriented to face in the opposite direction to the direction of flight of the aircraft and energy absorber means attached between the seat means and the floor of the aircraft. The energy absorber means include: forward energy absorber means attached between a forward section of the seat means and the floor of the aircraft and having a capability of operating in both tension and compression: intermediate energy absorber means attached between the seat and the floor of the aircraft rearwardly of the forward energy absorber means and having the capability of operating in tension and compression, at different levels of force at different stages of crash induced acceleration: and rearward energy absorber means attached between the seat and the floor of the aircraft, the rearward energy absorber means having the capability of operating in both tension and compression. In particular applications, the seat may comprise paired seat members disposed abreast or three-seat arrays disposed abreast as in commercial fixed wing aircraft. In this manner, energy attendant upon a crash is absorbed and the seat means is enabled to flex with crash-induced distortions of the floor of the aircraft to prevent separation of the seat means therefrom.

BRIEF DESCRIPTION OF THE DRAWINGS

FIG. 1 is a side elevation of a crashworthy seat for fixed wing aircraft in accordance with the invention; and FIG. 2 is a front view of the apparatus depicted in FIG. 1.

DETAILED DESCRIPTION OF THE INVENTION

As depicted in FIGS. 1 and 2, a crashworthy passenger seat 10 in accordance with the invention comprises a pair of seat members 12,14, abreast and rearwardly facing vis a vis the direction of flight of the aircraft in which they are installed. Seats 12, 14, being identical, detailed description of one will be equivalent to, and identical to, the description of the other.

Seat 12 comprises a seat back member 16 and a seat bottom 18 pivotably attached thereto at pivot 20. The seat bottoms of seats 12, 14, are mounted upon support strut 22. Arm rests 24 are pivotably attached to the strut 22 and are disposed in conventional fashion with respect to the seat back member 16 and the seat bottom member 18 in the depicted embodiment.

Shoulder harness members 25 are attached near the top of seat back member 16 and extend downwardly to be lockably engageable with a buckle 26, which in turn is attached to a strap 28. The harness arrangement 26, in conventional fashion, contains adjustable fasteners 30 to adapt to the girth of occupants of a range of sizes.

Lap belt members 31 are affixed to seat bottom 18 and extend upwardly therefrom to be lockably engageable with buckle 26; the lap belt members 31 are equipped with adjustable fasteners 32 to adapt to occupants of various sizes.

Seat system 10 rests upon energy absorbers connected between the seat bottom member 18 and the floor of the aircraft; such energy absorbers include a pair of forward energy absorbers 34. Energy absorbers 34 are of the type described and claimed in U.S. Pat. No. 3,369,634 to Bernard Mazelsky, Applicant herein, and assigned to the Assignee hereof. They are fully disclosed in the aforesaid U.S. patent and will thus be described only briefly herein. Energy absorbers 34 absorb energy in tension and compression through the deformation of plastically deformable coils (not shown herein) within a pair of telescoped tubular members 36, 38, upon motion of the members 36, 38 relative to each other. The term "forward" employed hereinabove refers to the direction of flight of the aircraft as to which, as noted above, the seat 10 is rearwardly facing. In the depicted double-seat arrangement, the forward energy absorbers 34 are disposed at the left and right lateral periphery of seats 12, 14. For an embodiment comprising a single seat member, the said forward energy absorbers 34 and other energy absorbers referred to hereinbelow would be disposed at the left and right lateral periphery of the single seat member.

Disposed beneath the seat 12 are a pair of intermediate energy absorbers 40. Intermediate energy absorbers 40 are of the type described and claimed in U.S. Pat. No. 4,066,149 to the Applicant herein and assigned to the Assignee hereof. Briefly, intermediate energy absorbers 40 comprise a two-stage energy absorption pattern and include three telescoping tubular members 42, 44 and 46, telescoped within one another, respectively, and including between each pair of telescoped tubular members plastically deformable coils (not shown) such that energy is absorbed in tension or compression through relative movement of the tubular members 42, 44, and 46 with respect to one another. As disclosed fully in the aforesaid U.S. patent, the pattern of energy absorption of the multi-stage intermediate energy absorber 40 exhibits a two-stage pattern with two different levels of force at which energy is absorbed.

Also disposed beneath seat 12 are a pair of rear energy absorbers 48. Rear energy absorbers 48 are of the same character as forward energy absorbers 34 and, as such are fully described in the aforesaid U.S. Pat. No. 3,369,634.

Referring again to forward energy absorbers 34, these energy absorbers are pivotably attached at their upper ends to fittings 54 affixed to the bottom of seat bucket member 18 and are attached at their lower ends, also pivotably, to fittings 56 which are in turn fastened to anchors 58 attached to the floor 60 of the aircraft. Forward stabilizing rods 50 are attached at their upward ends to the same fittings as are the upward ends for forward energy absorbers 34. At their lower ends, stabilizing rods 50 are attached to anchors 58. Intermediate energy absorbers 40 are disposed substantially diagonally between the forward and rearward extent of the seat 10 and are pivotably attached at their upper ends to fittings 62 affixed to seat bottom 18; they are pivotably attached at their lower ends to fittings 64, affixed to anchors 66 attached to the floor 60 of the aircraft.

Rearward energy absorbers 48 are pivotably attached to fittings 68 affixed to the bottom of seat bucket member 18 and to fittings 70 attached to anchors 66. Pivoting of rearward energy absorbers 48 and forward energy absorbers 34 are around axes which are perpendicular, to one another, as between the forward and the rearward locations.

Under crash conditions, the floor of the aircraft flexes and vibrates due to forces attendant upon the crash. The arrangement of energy absorbers and stabilizing rods in accordance with the invention absorbs vibrational energy associated with flexing and distortion of the floor of the aircraft and at the same time permits the seat to flex with the floor. This is due to the fact of the favorable characteristics of stroking distance and force level of the energy absorbers employed in accordance with the invention. The stabilizing rods provide lateral stability against yawing. Thus, the substantial problem of passenger safety in fixed wing aircraft, namely separation of the passenger seats from the floor of the aircraft due to floor distortion induced by a crash, is substantially eliminated as is the extremely dangerous, often fatal, "second impact." Thus, safety of passengers is substantially increased.

In particular applications of the invention, in which two occupants, each of the 95th percentile in weight, occupy the paired seats 12, 14, the force levels in compression of the forward energy absorbers 34 were substantially equal to 5,000 pounds ±15 percent; the force levels of the intermediate energy absorbers 40 were, in the intial stage, substantially equal to 1,500 pounds and in the second stage, 1,700 pounds, with a deviation not substantially exceeding 15 percent. The rearward energy absorbers 48 operated at a force level substantially equal to 2,000 pounds with a range of ±10 percent. In the particular application referred to, the forward energy absorbers 34 operated in compression only, although capable of operating in tension as well, whereas the intermediate energy absorbers 40 operated in tension only though, of course, capable of operating in compression as well. Rearward energy absorbers 48 operated in compression and tension. In the specific application under discussion, the forward stabilizing rods 50 operated at a force level substantially equal to 2,500 pounds and the rearward stabilizing rods 52, at a force level substantially equal to 1,500 pounds.

The invention herein is equally applicable to seats accommodating single occupants and two three-person seating arrangements which are common in commercial aircraft.

Through a particular embodiment of the invention has been described and depicted hereinabove, the invention is defined solely by the appended claims construed in light of the specification.

I claim:

1. A rearward facing, crashworthy seat for fixed wing aircraft comprising:

seat means oriented to face in the opposite direction to the direction of flight of the aircraft;

energy absorber means disposed between said seat means and the floor of the aircraft, said energy absorber means including forward energy absorber means attached between a forward section of said seat means and the floor of the aircraft and being capable of operating in both tension and compression, intermediate energy absorber means attached between said seat means and the floor of the aircraft rearwardly of said forward energy absorber means, said intermediate energy absorber means being capable of operating in tension and compression and being operable to absorb energy at at least two different levels of force in a first stage following a crash and a second stage following said first stage, said intermediate energy absorber means absorbing energy at a lower level of force during said first stage following a crash and at a higher level of force in said second stage following said first stage, and rearward energy absorber means disposed rearwardly of said intermediate energy absorber means and attached between said seat means and the floor of said aircraft, said rearward energy absorber means having the capability of operating in both tension and compression.

2. The invention as set forth in claim 1 wherein said intermediate energy absorber means are disposed substantially diagonally from forward to rearward of said seat member.

3. The invention as set forth in claim 2 further including stabilizing rod means attached between said seat means and the floor of the aircraft adjacent said forward energy absorber means, said stabilizing rod means disposed substantially diagonally between said forward energy absorber means.

4. The invention as set forth in claim 1 further including stabilizing means attached between said seat means and the floor of the aircraft adjacent said rearward energy absorber means, said stabilizing rod means disposed substantially diagonally between said rearward energy absorber means.

5. The invention as set forth in claim 1 wherein said intermediate energy absorber means are disposed substantially diagonally with respect to the fore and aft direction of the seat means, the upper portion of said intermediate energy absorber means being attached forwardly of the bottom of said intermediate energy absorber means.

6. The invention as set forth in claim 1 wherein said forward energy absorbers are adapted to operate at a force level substantially equal to 5,000 pounds, wherein the intermediate energy absorber means are adapted to operate at an initial stage immediately following a crash at a force level substantially equal to 1,500 pounds and in a second stage following said first stage at a force level substantially equal to 1,700 pounds, and wherein said rearward energy absorber means are operable to absorb energy at a force level substantially equal to 2,000 pounds.

7. The invention as set forth in claim 1 wherein said seat means comprises a pair of seat membes abreast of one another, wherein said forward energy absorber means comprise a pair of forward energy absorber members disposed adjacent the lateral periphery of the left and right sides respectively, of said seat members, said energy absorber members extending from the left and right sides respectively in a forwardly and laterally slanted direction away from each other and away from said rearward energy absorber means to the floor of the aircraft, said intermediate energy absorber means comprise a pair of intermediate energy absorber members disposed adjacent the lateral periphery at the left and right sides of said seat members, said pair of intermediate energy absorber members extending from the left and right sides in a laterally slanted direction away from each other to the floor of the aircraft and wherein said rearward energy absorber means comprise a pair of rearward energy absorber members disposed adjacent the lateral periphery at the left and rights sides of the said seat members said pair of energy absorber members extending from the left and right sides in a rearwardly and laterally slanted direction away from each other to the floor of the aircraft.

8. A rearward facing crashworthy seat for fixed wing aircraft comprising:
seat means oriented to face in the opposite direction to the direction of flight of the aircraft;
energy absorber means disposed between said seat means and the floor of the aircraft, said energy absorber means having the capability of operating in both tension and compression, at least one of said energy absorber means absorbing energy in a first stage following a crash and a second stage following said first stage, and absorbing energy at a lower level of force during said first stage following a crash and at a higher level of force in the second stage following said first stage,; and
stabilizing rod means disposed adjacent said energy absorber means and attached between said seat means and the floor of said aircraft, absorbing energy of a crash and adapted so that said seat means accomodates floor distortions of the aircraft, to prevent separation of said seat means from the aircraft and to prevent yawing.

9. A rearward facing crashworthy seat for fixed winged aircraft comprising:
seat means oriented to face in the opposite direction to the direction of flight of the aircraft,
energy absorber means disposed between said seat means and the floor of the aircraft, said energy absorber means including forward energy absorber means attached between a forward section of said seat means and the floor of the aircraft and being capable of operating in both tension and compression,
said energy absorber means including intermediate energy absorber means attached between said seat means in the floor of the aircraft rearwardly of said forward energy absorber means, said intermediate energy absorber means being capable of operating in tension and compression, and being operable to absorb energy of a crash in a first and second stage, absorption of energy in said first stage being at a lower level than absorption of energy in said second stage, said first stage taking place immediately following a crash of the aircraft and said second stage following said first stage, said energy absorber means also including rearward energy absorber means disposed rearwardly of said intermediate energy absorber means and attached between said seat means and the floor of the aircraft, said rearward energy absorber means having the capability of operating in both tension and compression, said forward energy absorbers operating at a force level higher than that of the rearward energy absorber means and said intermediate energy absorber means in the first stage operating at a force level intermediate between said forward energy absorber means and said rearward energy absorber means, said intermediate energy absorber means including at least two coil elements in at least three elongated movable elements in the form of at least three hollow tubular members arranged so that each of said coil elements is disposed between a pair of adjoining interfitting tubular members prior to a crash, said coil elements being operable upon relative motion of adjoining tubular members frictionally engaged therewith to absorb energy of a crash at a preselected level of force, said interfitting tubular members being movable under crash conditions to operate said coil elements to absorb energy in a predetermined sequence, said at least three hollow tubular members comprising a first hollow tubular member, a second hollow tubular member and a third hollow tubular member, said first hollow tubular member being attached to a first end piece and having an open end opposite to said first end piece, said second hollow tubular member having a portion thereof disposed within said first tubular member prior to a crash of said aircraft, said second tubular member being attached to a second end piece opposite said first end piece, said third tubular member being disposed within second tubular member in a pre-crash condition, said first coil element being disposed between and frictionally engaged with said first and second tubular members in a pre-crash condition, said second coil element being disposed between and frictionally engaged with said second and third tubular members in a pre-crash condition, said first coil element being operable to absorb energy at a first force level, said second coil element being operable to absorb energy at a second force level, said predetermined sequence of operation of said tubular members including at least a first stage and a second stage of operation thereof whereby in said first stage immediately following a crash of said aircraft said first coil element operates to absorb energy and in a second stage following said first stage said second coil element operates to absorb energy, stabilizing rod means attached between said seat means and the floor of the aircraft adjacent said forward energy absorber means, said stabilizing rod means being capable of absorbing energy in tension, stabilizing rod means attached between said seat means and the floor of the aircraft adjacent said rearward energy absorber means, said stabilizing rod means being capable of absorbing energy in tension.

10. The invention as set forth in claim 9, said forward energy absorbers operating at a force level substantially equal to 5,000 pounds, said rearward energy absorbers operating at a force level substantially equal to 2,000 pounds, the force level of the first stage of said intermediate energy absorbers being substantially equal to 1,500 pounds, the force level of the second stage of said intermediate energy absorbers being substantially equal to 1,700 pounds, said stabilizing rod means adjacent said forward energy absorbers being adapted to operate at a force level substantially equal to 2,500 pounds, and said stabilizing rod means adjacent said rearward energy absorbers being adapted to operate at a force level substantially equal to 1,500 pounds.

11. The invention as set forth in claim 9 said forward energy absorber means comprising a pair of energy absorber members extending from the seat means in a forwardly and laterally slanted direction away from each other and away from said rearward energy absorber means to the floor of the aircraft, said rearward energy absorber means including a pair of energy absorber members extending in a rearwardly and laterally slanted direction from said seat means away from each other and away from said forward energy absorber means to the floor of the aircraft, and said intermediate energy absorber means including a pair of intermediate energy absorber members disposed diagonally from said seat means adjacent said forward energy absorber members to the floor of the aircraft adjacent said rearward energy absorber members and extending in a laterally slanted direction away from each other to the floor of the aircraft.

12. The invention as set forth in claim 9 said stabilizing rod means including a pair of stabilizing rod members attached between said seat means and the floor of the aircraft, said pair of stabilizing rod members extending diagonally from said seat means adjacent the forward energy absorber members to the floor of the aircraft adjacent the opposite forward energy absorbing members.

13. The invention as set forth in claim 9 said stabilizing rod means including a pair of stabilizing rod members attached between said seat means and the floor of the aircraft, said pair of stabilizing rod means extending diagonally from said seat means adjacent the rearward energy absorber members to the floor of the aircraft adjacent the opposite rearward energy absorbing members.

14. The invention as set forth in claim 9 wherein said seat means comprises a pair of said seat members abreast of one another, said forward energy absorber members being spaced approximately 40 inches apart at the floor of the aircraft, said forward energy absorber means being spaced approximately 35 inches apart at the seat members, and said forward energy absorber means being spaced approximately 12½ inches from the floor of the aircraft to the seat members, said forward energy absorber members being spaced approximately 24 inches from said rearward energy absorber members at the floor of the aircraft allowing for stability of said seat during crash conditions for occupants between the fifth percentile and ninety-fifth percentile weights resulting in various locations of a center of gravity of the seat in combination with the occupants.

15. The invention as set forth in claim 14 spacing of said forward shock absorber members at the floor of the aircraft being proportional to spacing of said forward shock absorber members from said rearward shock absorber members and being in the approximate ratio 24/40, spacing of said forward shock absorber members being proportional to spacing between said seat and the floor of the aircraft and being in the approximate ratio 24/12½.

* * * * *